(12) United States Patent
Jackson et al.

(10) Patent No.: US 10,986,763 B2
(45) Date of Patent: Apr. 27, 2021

(54) METHOD AND APPARATUS FOR EXTENDING THE SERVICE LIFE OF AN AGRICULTURAL PLANTER

(71) Applicants: Cody Dale Jackson, New Boston, MO (US); Ronnie Dale Jackson, Jr., New Boston, MO (US)

(72) Inventors: Cody Dale Jackson, New Boston, MO (US); Ronnie Dale Jackson, Jr., New Boston, MO (US)

( * ) Notice: Subject to any disclaimer, the term of this patent is extended or adjusted under 35 U.S.C. 154(b) by 96 days.

(21) Appl. No.: 16/242,646

(22) Filed: Jan. 8, 2019

(65) Prior Publication Data

US 2019/0230840 A1    Aug. 1, 2019

Related U.S. Application Data

(60) Provisional application No. 62/687,336, filed on Jun. 20, 2018, provisional application No. 62/624,265, filed on Jan. 31, 2018, provisional application No. 62/622,461, filed on Jan. 26, 2018.

(51) Int. Cl.
*A01B 59/042*    (2006.01)

(52) U.S. Cl.
CPC ................... *A01B 59/042* (2013.01)

(58) Field of Classification Search
CPC ........ A01B 59/042; A01B 59/04; A01B 59/00
See application file for complete search history.

(56) References Cited

U.S. PATENT DOCUMENTS

| | | | |
|---|---|---|---|
| 2015/0173755 A1* | 6/2015 | Baxter, III | ........... A61B 17/072 227/180.1 |
| 2017/0014998 A1* | 1/2017 | Langenfeld | .............. B25J 9/126 |

* cited by examiner

*Primary Examiner* — Christopher J. Novosad (57) ABSTRACT

An agricultural planter and tractor combination which has a connection therebetween which comprises a stationary support arm coupled to the tractor and a pivoting support arm coupled to the agricultural planter with a connecting threaded member extended therethrough and a rotation-limited intermediate member with two protrusions extending into voids in the pivoting support arm so that the pivoting support arm will not rotate around the connecting threaded member and the connecting threaded member further translated through a portion of a hex-headed bushing and rotationally advanced through another portion, and a terminal nut also rotationally advanced over the connecting threaded member. The rotation-limited intermediate member is made of a harder more durable material than the connecting threaded member, the stationary support arm and the pivoting support arm.

20 Claims, 5 Drawing Sheets

METHOD AND APPARATUS FOR EXTENDING THE SERVICE LIFE OF AN AGRICULTURAL PLANTER

CROSS REFERENCE TO RELATED APPLICATIONS

The present application claims the benefit of the filing date of provisional patent application having Ser. No. 62/687,336 filed on Jun. 20, 2018 by the same inventors; the provisional application having Ser. No. 62/624,265 filed on Jan. 31, 2018 by the same inventors; and the provisional application having Ser. No. 62/622,461 filed on Jan. 26, 2018 by the same inventors, which applications are incorporated herein in their entirety by this reference.

FIELD OF THE INVENTION

The present invention relates generally to agricultural planters and/or precision planters with pivoting arms.

BACKGROUND OF THE INVENTION

In the past, individuals have been known to employ mechanisms to seed fields in the regular course of operating an agricultural farm. These mechanisms are regularly equipped with a series of functional, mobile segments and linkages with which the mechanisms may perform work at or near ground level. These mechanisms are additionally known to be equipped with suspension systems conducive to traversing rough, uneven, or unstable terrain frequently encountered during normal operations. Due to the uneven nature of a tilled and prepared field, these mobile segments and linkages are required to flex and adapt to variable terrain conditions during normal operation. This means of adaptation is known to often take the form of arms connecting the primary mobile portion of the mechanism (either an external tractor or a means of self-propulsion) to the seed-dispensing (or other function) components of the mechanism. This pivoting action is known to cause wear and eventual damage to the arms of the mechanism, often requiring replacement before proper operation may resume. This need for repairs can be costly not only due to the expense of new arms, but due to the mandatory down-time and service fees associated with mechanical repair of critical components.

Consequently, there is a need to provide agricultural planters which have an extended life span, especially with respect to the wear often associated with the pivot arms.

SUMMARY OF THE INVENTION

It is an object of the present invention to extend the service life of an agricultural planter in an economical and efficient manner.

It is a feature of the present invention to insert into a pivoting support arm pivot location orifice a bushing with a smooth internally threaded shaft portion.

It is an advantage of the present invention to reduce unintended motion of a pivot arm of an agricultural planter.

The present invention is intended to achieve the objectives, include the features and provide the advantages as set out above.

The present invention is a method for providing pivoting support to an agricultural planter, with a reduction in wear-induced free motion, comprising the steps of:
providing a tractor;
providing an agricultural planter;
providing a first support arm, configured to be coupled to said tractor;
said first support arm configured with a first support arm pivot location orifice, having an inside first support arm pivot location orifice diameter;
providing a pivoting support arm, configured to be coupled to portions of said agricultural planter;
said pivoting support arm, configured with a pivoting support arm pivot location orifice, and a pivoting support arm peg receiving orifice;
providing a rotation-limited intermediate member;
said rotation-limited intermediate member configured with a rotation-limited intermediate member panel portion with protruding therefrom a rotation-limited intermediate member collar portion, with an outside collar diameter and an inside rotation-limited intermediate member pivot location orifice diameter; and, a rotation-limited intermediate member peg portion;
said outside collar diameter being larger than said first support arm pivot location orifice by an amount greater than or equal to a difference between inside rotation-limited intermediate member pivot location orifice diameter said inside first support arm pivot location orifice diameter;
inserting said rotation-limited intermediate member collar portion into said pivoting support arm pivot location orifice such that said rotation-limited intermediate member peg portion is aligned with and received into said pivoting support arm peg receiving orifice;
inserting a connecting threaded member through said first support arm pivot location orifice, through said pivoting support arm pivot location orifice, said rotation-limited intermediate member pivot location orifice;
tightening a hex-headed bushing over said connecting threaded member; and
tightening a terminal nut over said connecting threaded member.

The present invention also includes a system for providing pivoting support to an agricultural planter, with a reduction in wear-induced free motion, comprising:
a first support arm with a first support arm pivot location orifice, having an inside first support arm pivot location orifice diameter;
a pivoting support arm, configured to be coupled to portions of an agricultural planter;
said pivoting support arm configured with a pivoting support arm pivot location orifice and a pivoting support arm peg receiving orifice;
a rotation-limited intermediate member configured with a rotation-limited intermediate member panel portion with protruding therefrom a rotation-limited intermediate member collar portion, with an outside collar diameter and an inside rotation-limited intermediate member pivot location orifice diameter; and, a rotation-limited intermediate member peg portion;
said outside collar diameter being larger than said first support arm pivot location orifice by an amount greater than or equal to a difference between inside rotation-limited intermediate member pivot location orifice diameter said inside first support arm pivot location orifice diameter;
said rotation-limited intermediate member collar portion being disposed and oriented in said pivoting support arm pivot location orifice such that said rotation-limited intermediate member peg portion is aligned with and received into said pivoting support arm peg receiving orifice;

a connecting threaded member disposed through said first support arm pivot location orifice, through said pivoting support arm pivot location orifice, said rotation-limited intermediate member pivot location orifice;

a hex-headed bushing tightened over said connecting threaded member; and a terminal nut tightened over said connecting threaded member.

The invention further including a method of refurbishing a connection between an agricultural planter and a tractor comprising the steps of:

creating a pivoting support arm peg receiving orifice in a pivoting support arm displaced from a pivoting support arm pivot location orifice;

inserting portions of a rotation-limited intermediate member into said pivoting support arm so that a rotation-limited intermediate member collar portion fits within said pivoting support arm pivot location orifice and a rotation-limited intermediate member peg portion fits into said pivoting support arm peg receiving orifice;

inserting a hex-headed bushing internally threaded shaft portion of a hex-headed bushing into a rotation-limited intermediate member pivot location orifice which extends through said rotation-limited intermediate member;

translating a connecting threaded member through an orifice through a stationary support arm coupled to a tractor;

further translating the connecting threaded member through the pivoting support arm pivot location orifice, rotation-limited intermediate member collar portion, and hex-headed bushing internally threaded shaft portion;

rotationally advancing one of said connecting threaded member and hex-headed bushing with respect to the other of said connecting threaded member and said hex-headed bushing; and rotationally advancing one of said connecting threaded member and said terminal nut with respect to the other of said connecting threaded member and said terminal nut.

DETAIL DESCRIPTIONS OF THE INVENTION

All illustrations of the drawings are for the purpose of describing selected versions of the present invention and are not intended to limit the scope of the present invention.

Figure 1:
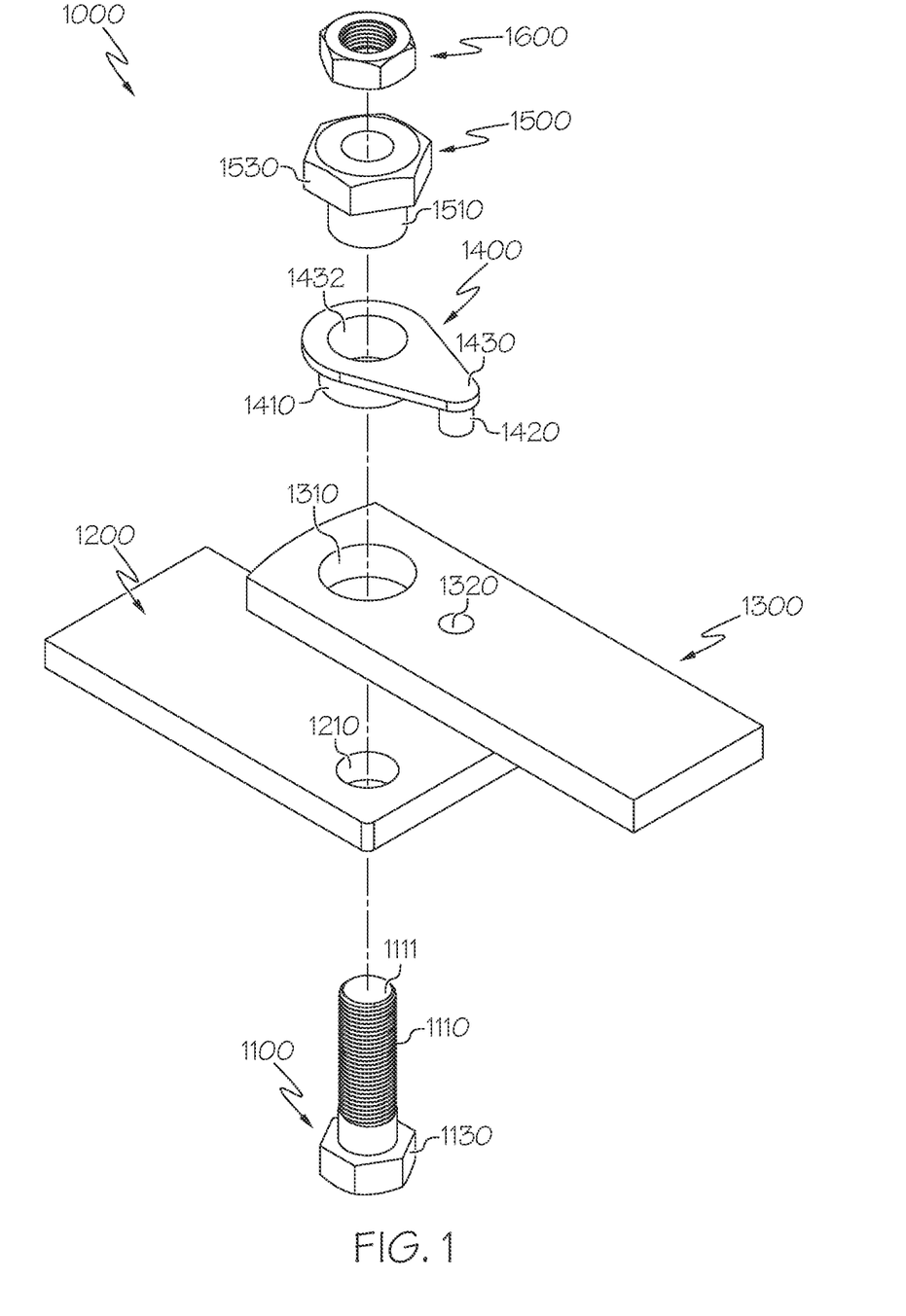
FIG. 1 is an exploded view of a portion of the present invention.

Now referring to the drawings wherein like numerals refer to like matter throughout; and more particularly, now referring to FIG. 1, there is shown a portion of an agricultural planter of the present invention, generally designated 1000, which includes a stationary support arm 1200, which could be OEM structure or it could be an aftermarket structure coupled to a tractor or other vehicle capable of being moved about an agricultural field. Stationary support arm 1200 includes stationary support arm pivot location orifice 1210 (which can partially be seen in, but is not labeled in, FIG. 2) and is shown having an axis running therethrough from the free end 1111 of connecting threaded member threaded portion 1110 of connecting threaded member 1100. The axis also runs through the pivoting support arm pivot location orifice 1310 of pivoting support arm 1300, which is an arm where portions of the planter can be loaded thereon and/or coupled thereto. The axis is next shown running through the rotation-limited intermediate member pivot location orifice 1432 in rotation-limited intermediate member 1400, which includes a rotation-limited intermediate member collar portion 1410, a rotation-limited intermediate member peg portion 1420 and a rotation-limited intermediate member panel portion 1430.

In a preferred embodiment, the rotation-limited intermediate member collar portion 1410 may be a cylinder with non-threaded internal and external cylindrical surfaces. Rotation-limited intermediate member peg portion 1420 is used to limit rotation of rotation-limited intermediate member 1400 with respect to the pivoting support arm pivot location orifice 1310.

The axis is shown running completely through hex-headed bushing 1500, which includes hex-headed bushing internally threaded shaft portion 1510, which preferably has a smooth exterior cylindrical surface, and a hex-headed bushing internally threaded hex head portion 1530, which is preferably configured to be engaged with a wrench.

Lastly, the axis is shown running to the terminal nut 1600.

Figure 3:
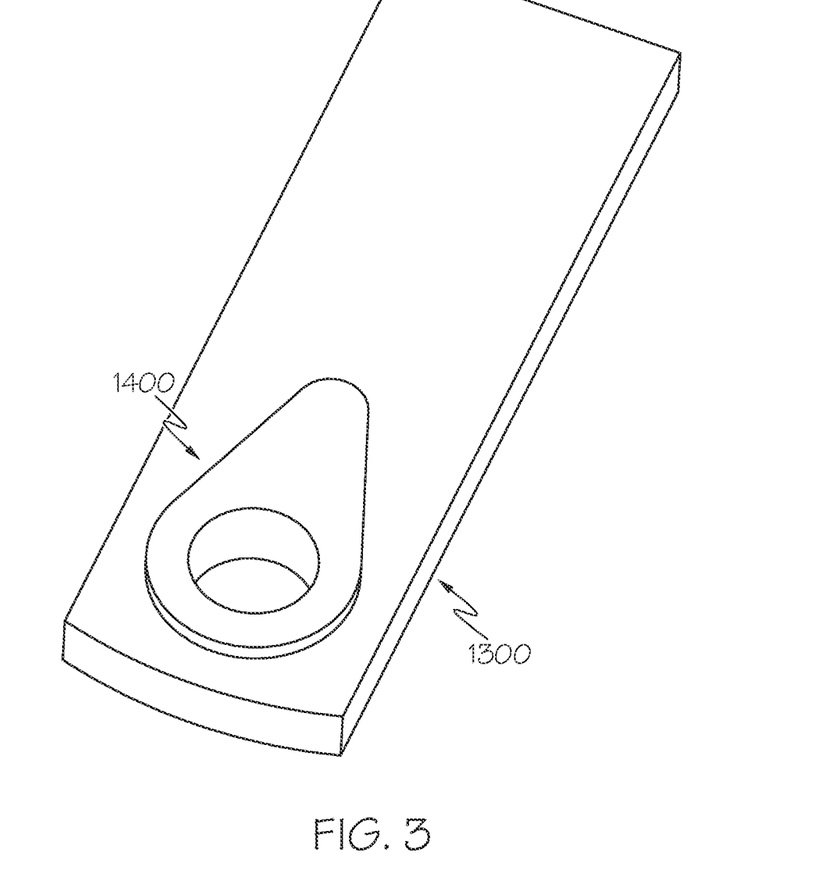
FIG. 3 is a view of portions of the invention of FIGS. 1 and 2 in an intermediate stage of assembly.

Also shown is connecting threaded member 1100, which is intended to be inserted through stationary support arm 1200 and pivoting support arm 1300 and further through rotation-limited intermediate member 1400 when it is engaged with pivoting support arm 1300, as shown in FIG. 3. The hex-headed bushing 1500 is tightened on the connecting threaded member 1100 from the free end 1111. Lastly, the terminal nut 1600 is also tightened on the connecting threaded member threaded portion 1110 until it contacts the hex-headed bushing internally threaded hex-head portion 1530.

Figure 2:
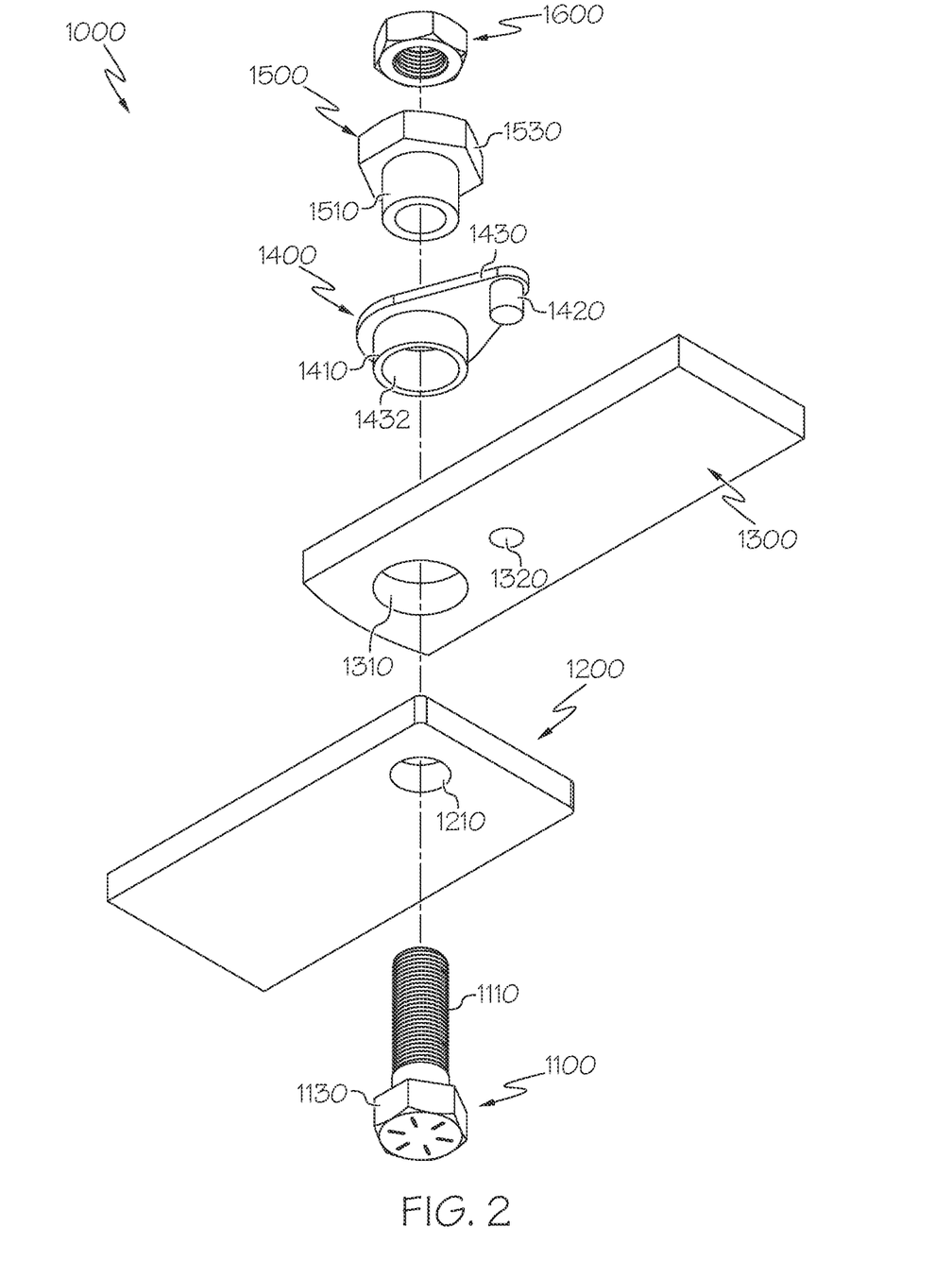
FIG. 2 is another view of portions of the invention of FIG. 1, from a different position.

Now referring to FIG. 2, there is shown portions of the invention shown in FIG. 1, but from a different point of view.

Now referring to FIG. 3, there is shown a portion of the present invention, which has the rotation-limited intermediate member 1400 disposed so that the rotation-limited intermediate member collar portion 1410 is disposed in the pivoting support arm pivot location orifice 1310. This is a state of partial assembly of the present invention.

Figure 4:
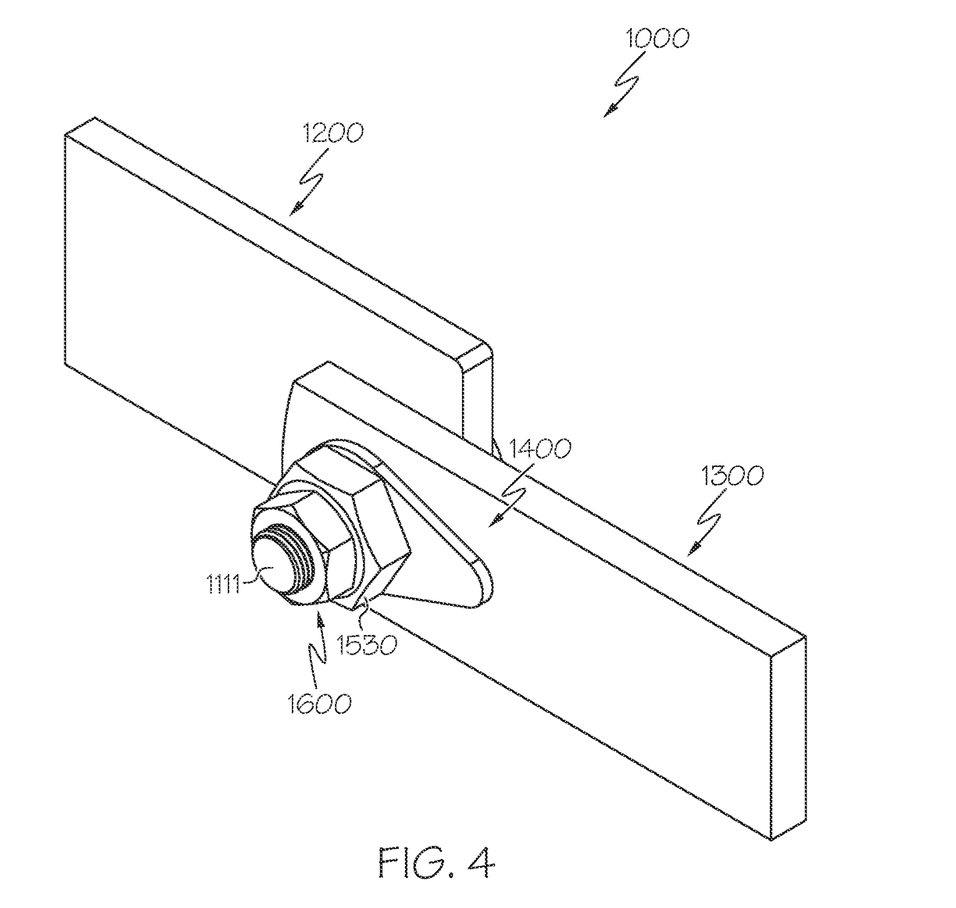
FIG. 4 is a close-up view of portions of the invention of FIGS. 1, 2 and 3 at a final stage of assembly.

Now referring to FIG. 4, there are shown portions of the present invention in a fully assembled state with the hex-headed bushing 1500 engaging the rotation-limited intermediate member panel portion 1430 and the terminal nut 1600 disposed around the free end 1111 of connecting threaded member 1100.

Figure 5:
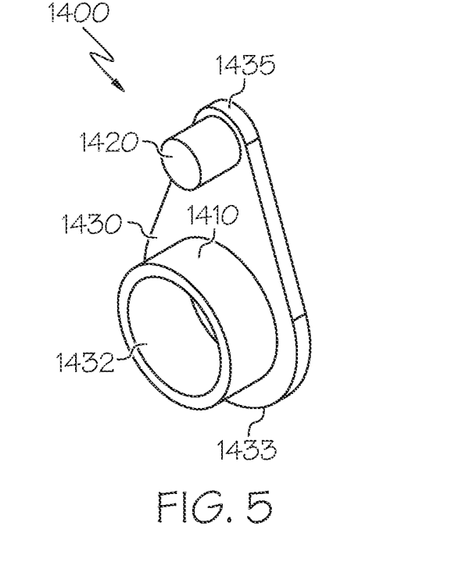
FIG. 5 is a perspective underside view of the rotation-limited intermediate member of the present invention.

Now referring to FIG. 5, there is shown an underside view of the rotation-limited intermediate member 1400 of the present invention. In general, this is a flanged bushing. The rotation-limited intermediate member 1400 is harder than hex headed bushing 1500, pivoting support arm 1300, stationary support arm 1200, and connecting threaded member 1100 it aims to make hex headed bushing 1500 as an interchangeable, sacrificial wear item. Preferably hex headed bushing 1500 will absorb damage of continuous and routine friction and rotational strain that might otherwise be borne by the components of any suitable mechanism. The hex headed bushing 1500 is intended to be significantly smaller, cheaper, and easier to service or replace than other portions of the mechanism that may require periodic maintenance in the absence of the present invention. It is therefore the intention of the hex headed bushing 1500 to serve as a designated point of failure between two functional components, effectively acting as a mechanical "fuse" for an associated mechanism.

Figure 6:
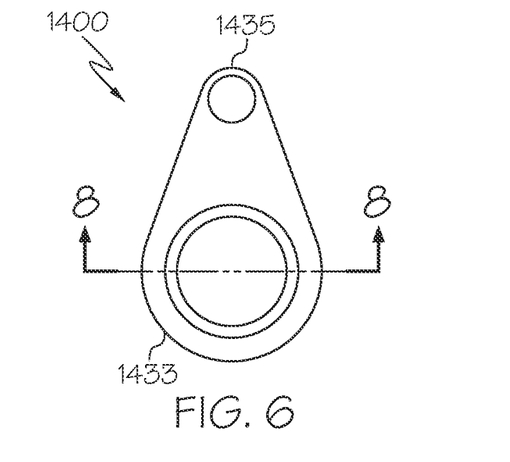
FIG. 6 is a bottom underside view of the rotation-limited intermediate member of present invention.
Figure 7:
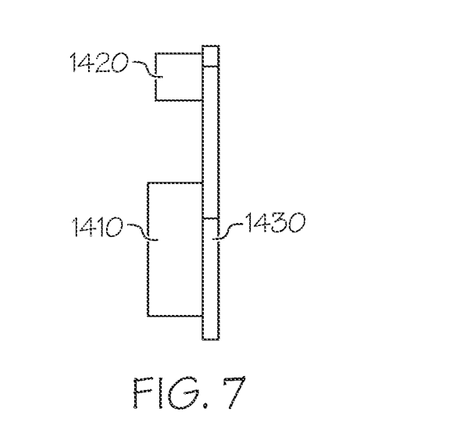
FIG. 7 is a side view of the rotation-limited intermediate member of present invention.
Figure 8:
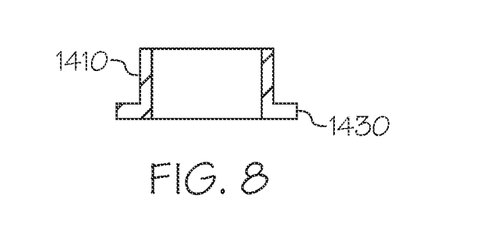
FIG. 8 is a cross-sectional view of the rotation-limited intermediate member taken on line 8-8 of FIG. 6.

In reference to FIGS. 6-8, the rotation-limited intermediate member 1400 comprises a rotation-limited intermediate member panel portion 1430, a rotation-limited intermediate member collar portion 1410 or simply "collar," and a rotation-limited intermediate member peg portion 1420, or simply referred to as "dowel" or "peg." The rotation-limited intermediate member panel portion 1430 constitutes a planar material from which the collar and rotation-limited intermediate member peg portion 1420 protrude. In the ideal embodiment, the collar and rotation-limited intermediate member peg portion 1420 both protrude from the same face of the rotation-limited intermediate member panel portion 1430. In alternate embodiments, the collar and rotation-limited intermediate member peg portion 1420 may protrude from both, or alternate faces of the rotation-limited intermediate member panel portion 1430. The rotation-limited intermediate member panel portion 1430, collar, and rotation-limited intermediate member peg portion 1420 are ideally formed of a single contiguous material through powdered metal sintering or precision casting, but are understood to be formed through any means, without limitation.

The rotation-limited intermediate member panel portion 1430 can be expressed as having a first tangent, a second tangent, a perforation or aka rotation-limited intermediate member pivot location orifice 1432, a first arc 1433, and a second arc 1435. The first arc 1433 defines the outermost edge of the larger segment of the panel, concentrically surrounding the perforation and the area to which the collar is mounted. The second arc 1435 defines the opposite edge of the rotation-limited intermediate member panel portion 1430, surrounding the area from which the rotation-limited intermediate member peg portion 1420 protrudes. The first tangent defines a connecting segment between the proximal end of the first and the proximal end of the second arc. The second tangent defines a connecting segment between the distal end of the first arc and the distal end of the second arc. The first arc, second arc, first tangent, and second tangent, collectively, define the outer perimeter of the rotation-limited intermediate member panel portion 1430, ideally in a rounded "teardrop" shape. It is understood that the rotation-limited intermediate member panel portion 1430 may be formed in a variety of alternate shapes in and dimensions to suit variable alternate components without departing from the scope of the present invention. The perforation is a hole traversing the width of the rotation-limited intermediate member panel portion 1430, ideally confined concentrically to the first arc. This perforation is ideally circular but may be formed in any shape or relative position. Ideally, this perforation is positioned concentrically with the collar, to allow passage of a variety of fasteners to secure the flanged bushing into operating position.

The collar comprises a first fillet, a second fillet, a third fillet, a conduit, and a first seam. The conduit defines the wall of the tubular section of the collar, ideally concentric to the perforation of the panel. This conduit would ideally not occlude any portion of the perforation, continuing the dimensions established by the perforation through to the distal end of the conduit. The first fillet defines the outer edge of the distal end of the conduit, ideally chamfered to facilitate insertion of the collar into a larger aperture. The second fillet defines the inner edge of the distal end of the conduit, ideally chamfered to facilitate passage of a fastener through the conduit. The third fillet defines the proximal edge of the conduit, positioned on the opposite face of the panel. The third fillet defines a similar surface feature to the second fillet, with similar intended functionality. The internal walls of the conduit are the primary wear surfaces of the flanged bushing, absorbing abrasive damage that might otherwise be borne by the associated aperture. The first seam defines the joint between the panel and the collar, though a more preferred embodiment of the invention may be formed where all components are from a single contiguous material. This first seam may be defined by any means or material without limitation. The inner and outer diameters of the collar, wall thickness, or any other dimensions are understood to be infinitely variable without departing from the original scope of the invention.

The rotation-limited intermediate member peg portion 1420 comprises a protrusion and a second seam. The protrusion defines an ideally cylindrical linear rod. In reference to FIG. 6, the rotation-limited intermediate member peg portion 1420 is intended to index the flanged bushing into a set angular position relative to the associated mechanism or aperture, such as pivoting support arm peg receiving orifice 1320. Alternate embodiments of the protrusion are understood to be infinitely variable with regards to shape and dimension to suit an unlimited number of possible use-cases without departing from the original scope of the invention. The second seam constitutes the joint between the rotation-limited intermediate member peg portion 1420 and the panel, ideally positioned concentric to the second arc of the panel. This second seam may be defined by any means or material, without limitation.

The method of the present invention for extending a service life of an agricultural planter comprises the steps of:
 providing a first vehicle, comprising a stationary support arm 1200, having a stationary support arm pivot location orifice 1210 disposed therethrough;
 providing an agricultural planter comprising a pivoting support arm 1300; having a pivoting support arm pivot location orifice 1310 disposed therethrough;
 providing a pivoting support arm peg receiving orifice 1320 in said pivoting support arm 1300;
 providing a rotation-limited intermediate member 1400 with a rotation-limited intermediate member panel portion 1430, a rotation-limited intermediate member peg portion 1420; and a rotation-limited intermediate member collar portion 1410, which is sized to fit in and fill the pivoting support arm pivot location orifice 1310;
 inserting a connecting threaded member 1100 through said stationary support arm pivot location orifice 1210, and pivoting support arm pivot location orifice 1310;
 providing a hex-headed bushing 1500, with a hex-headed bushing internally threaded shaft portion 1510;
 providing a terminal nut 1600;
 causing said connecting threaded member 1100 to be disposed through said rotation-limited intermediate member collar portion 1410;

tightening said hex-headed bushing 1500 onto said connecting threaded member 1100 until said hex-headed bushing 1500 contacts said rotation-limited intermediate member 1400; and tightening a terminal nut 1600 on said connecting threaded member 1100 until contact is made with said hex-headed bushing 1500.

An alternative to this method is to omit the rotation-limited intermediate member 1400 and tightening said hex-headed bushing 1500 so that said hex-headed bushing internally threaded shaft portion 1510 fits in and fills said pivoting support arm pivot location orifice 1310.

Although the invention has been explained in relation to its preferred embodiment, it is to be understood that many other possible modifications and variations can be made without departing from the spirit and scope of the invention.

We claim:

1. A method for providing pivoting support to an agricultural planter, with a reduction in wear-induced free motion, comprising the steps of:
   providing a tractor;
   providing an agricultural planter;
   providing a first support arm, configured to be coupled to the tractor;
   the first support arm configured with a first support arm pivot location orifice, having an inside first support arm pivot location orifice diameter;
   providing a pivoting support arm, configured to be coupled to portions of the agricultural planter;
   the pivoting support arm configured with a pivoting support arm pivot location orifice and a pivoting support arm peg receiving orifice;
   providing a rotation-limited intermediate member;
   the rotation-limited intermediate member configured with a rotation-limited intermediate member panel portion with protruding therefrom a rotation-limited intermediate member collar portion, with an outside collar diameter and an inside rotation-limited intermediate member pivot location orifice diameter; and, a rotation-limited intermediate member peg portion;
   the outside collar diameter being larger than the first support arm pivot location orifice by an amount greater than or equal to a difference between inside rotation-limited intermediate member pivot location orifice diameter the inside first support arm pivot location orifice diameter;
   inserting the rotation-limited intermediate member collar portion into the pivoting support arm pivot location orifice such that the rotation-limited intermediate member peg portion is aligned with and received into the pivoting support arm peg receiving orifice;
   inserting a connecting threaded member through the first support arm pivot location orifice, through the pivoting support arm pivot location orifice, the rotation-limited intermediate member pivot location orifice;
   tightening a hex-headed bushing over the connecting threaded member; and
   tightening a terminal nut over the connecting threaded member.

2. The method of claim 1 wherein the tractor is an unmanned mechanism for propulsion through an agricultural field.

3. The method of claim 1 wherein the first support arm is coupled to the tractor at a manufacturing location of the tractor.

4. The method of claim 1 wherein the first support arm is an after-market component.

5. The method of claim 1 wherein the agricultural planter is a commercially available agricultural planter.

6. The method of claim 1 wherein the pivoting support arm peg receiving orifice is performed at a location other than a location of manufacture of the agricultural planter.

7. The method of claim 1 further comprising the steps of at least one of:
   making changes to pivoting support arm pivot location orifice (1310) so as to facilitate receiving therein the rotation-limited intermediate member collar portion; and
   making changes to the pivoting support arm to facilitate receiving therein the rotation-limited intermediate member peg portion.

8. The method of claim 6 further comprising the step of making changes to pivoting support arm pivot location orifice so as to facilitate receiving therein the rotation-limited intermediate member collar portion.

9. The method of claim 1 further comprising the step of making a change to the first support arm pivot location orifice so as to receive therein the connecting threaded member.

10. The method of claim 9 wherein the connecting threaded member is configured to be larger than an original equipment connecting threaded member.

11. A system for providing pivoting support to an agricultural planter, with a reduction in wear-induced free motion, comprising:
    a first support arm, with a first support arm pivot location orifice, having an inside first support arm pivot location orifice diameter;
    a pivoting support arm, configured to be coupled to portions of an agricultural planter;
    the pivoting support arm configured with a pivoting support arm pivot location orifice and a pivoting support arm peg receiving orifice;
    a rotation-limited intermediate member configured with a rotation-limited intermediate member panel portion with protruding therefrom a rotation-limited intermediate member collar portion, with an outside collar diameter and an inside rotation-limited intermediate member pivot location orifice diameter; and, a rotation-limited intermediate member peg portion;
    the outside collar diameter being larger than the first support arm pivot location orifice by an amount greater than or equal to a difference between inside rotation-limited intermediate member pivot location orifice diameter the inside first support arm pivot location orifice diameter;
    the rotation-limited intermediate member collar portion being disposed and oriented in the pivoting support arm pivot location orifice such that the rotation-limited intermediate member peg portion is aligned with and received into the pivoting support arm peg receiving orifice;
    a connecting threaded member disposed through the first support arm pivot location orifice, through the pivoting support arm pivot location orifice, the rotation-limited intermediate member pivot location orifice;
    a hex-headed bushing tightened over the connecting threaded member; and
    a terminal nut tightened over the connecting threaded member.

12. The system of claim 11 further comprising a tractor.

13. The system of claim 12 wherein the first support arm is detachably coupled to a portion of the tractor.

14. The system of claim 11 wherein the rotation-limited intermediate member is a single casting.

15. The system of claim 14 wherein an internal surface of the rotation-limited intermediate member collar portion is free of any predetermined surface features configured to increase friction with an external surface of a hex-headed bushing internally threaded shaft portion of the hex-headed bushing.

16. The system of claim 15 wherein the hex-headed bushing is made of a first material which is softer than a second material which is used for rotation-limited intermediate member.

17. The system of claim 16 where the hex headed bushing is a predetermined replacement part.

18. A method of refurbishing a connection between an agricultural planter and a tractor comprising the steps of:
creating a pivoting support arm peg receiving orifice in a pivoting support arm displaced from a pivoting support arm pivot location orifice;
inserting portions of a rotation-limited intermediate member into the pivoting support arm so that a rotation-limited intermediate member collar portion fits within the pivoting support arm pivot location orifice and a rotation-limited intermediate member peg portion fits into the pivoting support arm peg receiving orifice;
inserting a hex-headed bushing internally threaded shaft portion of a hex-headed bushing into a rotation-limited intermediate member pivot location orifice which extends through the rotation-limited intermediate member;
translating a connecting threaded member through an orifice through a stationary support arm coupled to a tractor;
further translating the connecting threaded member through the pivoting support arm pivot location orifice, rotation-limited intermediate member collar portion, and hex-headed bushing internally threaded shaft portion;
rotationally advancing one of the connecting threaded member and hex-headed bushing with respect to the other of the connecting threaded member and the hex-headed bushing ; and
rotationally advancing one of the connecting threaded member and a terminal nut with respect to the other of the connecting threaded member and the terminal nut.

19. The method of claim 18 wherein a pivoting support arm pivot location orifice is formed by further enlarging an original pivoting support arm pivot location orifice which had been enlarged through wear caused by operation of the connection between the agricultural planter and the tractor.

20. The method of claim 19 wherein the orifice through the stationary support arm is formed by enlarging an original orifice through the stationary support arm which had been enlarged through wear caused by operation of the connection between the agricultural planter and the tractor; and
where the connecting threaded member has a diameter which is larger than a diameter of the original orifice through the stationary support arm.

* * * * *